E. Howe,
Halter.

N° 54,729.   Patented May 15, 1866.

Witnesses

Inventor
Elbridge Howe
by his attorney

UNITED STATES PATENT OFFICE.

ELBRIDGE HOWE, OF MARLBOROUGH, MASSACHUSETTS.

TETHERING-HALTER APPARATUS.

Specification forming part of Letters Patent No. 54,729, dated May 15, 1866; antedated April 13, 1866.

*To all whom it may concern:*

Be it known that I, ELBRIDGE HOWE, of Marlborough, in the county of Middlesex and State of Massachusetts, have invented a new and useful Tethering Halter or Apparatus; and I do hereby declare the same to be fully described in the following specification and represented in the accompanying drawings, of which—

Figure 1:
Figure 2:

Figure 1 is a side view, and Fig. 2 a longitudinal section, of it.

The object of my invention is to prevent a tethering rope or halter from catching and winding about the leg or legs of a horse or animal so as to do injury to him while tethered for feeding.

It is well known that it frequently happens that a valuable horse is severely injured and sometimes rendered entirely useless by being caught in a tethering rope or halter and the exertions of the animal to free himself therefrom.

I am enabled to effectually prevent such accidents by combining with the tethering-rope of the halter a series of short cylinders strung thereon, and having their ends rounded where they abut together. While they allow all the necessary flexibility of the halter-rope for ordinary purposes, they prevent it from being so coiled about the legs of the animal (having the halter affixed to his neck) as to enable him by it to do injury to himself.

In the drawings, A denotes an ordinary rope halter, of which $a$ is the neck-loop, and $b$ the knot, and $c$ the half-knot, thereof.

B B B, &c., are a series of short cylinders strung on the rope $d$ of the halter and between the two knots $e f$ arranged on the rope and at the extremes of the series of cylinders. The two ends of each cylinder are convex or rounded, and the cylinders are to be strung closely together, as shown in the drawings. Those nearest the neck-loop may be the smallest in diameter, and the cylinders may regularly increase in diameter as they proceed therefrom.

I would remark that instead of the neck-loop and its knot and half-knot, composing that part of the halter which is usually applied to the neck of a horse, any other well-known means may be adopted for fastening the halter-rope to the neck or head, or both, of a horse.

What I claim as my invention is—

The tethering apparatus, substantially as described, as composed of the halter and the series of cylinders as applied together, as and for the purpose specified.

ELBRIDGE HOWE.

Witnesses:
R. H. EDDY,
F. P. HALE, Jr.